United States Patent [19]

Fletcher

[11] Patent Number: 5,082,065

[45] Date of Patent: Jan. 21, 1992

[54] QUICK ATTACH IMPLEMENT COUPLER

[75] Inventor: Timothy M. Fletcher, Burnett, Wis.

[73] Assignee: Support Services International, Inc., Beaver Dam, Wis.

[21] Appl. No.: 567,975

[22] Filed: Aug. 15, 1990

[51] Int. Cl.$^5$ .................. A01B 59/048; E02F 3/76
[52] U.S. Cl. .................. 172/273; 172/817; 172/820; 37/231
[58] Field of Search .................. 172/47, 272, 273, 274, 172/275, 810, 811, 817, 820, 830; 37/231; 414/723

[56] References Cited

U.S. PATENT DOCUMENTS

| | | | |
|---|---|---|---|
| 3,034,237 | 5/1962 | Wolfe et al. | 414/723 X |
| 3,233,350 | 2/1966 | Malzahn et al. | 172/273 |
| 3,876,091 | 4/1975 | MacDonald | 172/273 |
| 3,876,092 | 4/1975 | MacDonald | 172/273 |
| 3,987,562 | 10/1976 | Deen et al. | 37/231 |
| 4,085,856 | 4/1978 | Westendorf | 172/273 |
| 4,116,346 | 11/1978 | Uchida | 172/273 |
| 4,215,496 | 8/1980 | Wehr | 172/817 X |
| 4,452,560 | 6/1984 | Coyle et al. | 172/273 |
| 4,477,101 | 10/1984 | Nilsson et al. | 172/272 |
| 4,509,768 | 4/1985 | Haug | 172/272 |
| 4,625,988 | 12/1986 | Witchey et al. | 172/273 |
| 4,717,166 | 1/1988 | Vachon | 172/817 X |
| 4,737,067 | 4/1988 | Samejima et al. | 172/297 |
| 4,755,101 | 7/1988 | Hamada et al. | 172/274 |
| 4,778,195 | 10/1988 | Vachon | 172/817 X |
| 4,826,389 | 5/1989 | Meyer et al. | 172/273 |
| 4,962,599 | 10/1990 | Harris | 37/231 X |

FOREIGN PATENT DOCUMENTS 3200800 7/1983 Fed. Rep. of Germany ...... 172/272

OTHER PUBLICATIONS

John Deere Lawn & Garden Tractors, 300–400 Series.

Primary Examiner—Randolph A. Reese
Assistant Examiner—Jeffrey L. Thompson
Attorney, Agent, or Firm—Lathrop & Clark

[57] ABSTRACT

A vehicle has front brackets which engage with a coupler which has an upright brace with two vertical members joined by a horizontal member. Fixed pins on the brace engage in the bracket slots and retractable spring-loaded pins on the brace engage with the holes on the bracket. A frame is pivotally mounted to the vertical members and is pivotable by an actuator which connects the brace and the frame. A support is pivotally mounted about an axis perpendicular to the frame and has an upturned flange adapted to engage beneath a downturned bracket on the implement and has pinholes located beneath the flange to receive pins extending from the implement. Fixed to the implement is a downturned J-shaped bracket with a vertical portion and a spaced opposed portion which is approximately as deep as the upward extension of the flange on the coupler. Vertical plates are connected on either side of the J-shaped bracket and are spaced to fit on either side of the support of the coupler. Spring-loaded locking pins are located on each vertical plate to travel freely through holes in the plate to engage within the locking holes of the coupler. The vertical plates of the coupling mechanism have rounded out-turned edges which horizontally align the implement coupler with the implement.

12 Claims, 6 Drawing Sheets

QUICK ATTACH IMPLEMENT COUPLER

FIELD OF THE INVENTION

The present invention relates to couplers for quickly attaching implements to vehicles.

BACKGROUND OF THE INVENTION

Utility-type vehicles are commonly used to perform a number of different jobs. The same vehicle may be used to plow, till, brush, blow, transport or drill. Each job requires the attachment of a specialized implement. Implements which mount directly to the vehicle may be heavy and cumbersome and require that the vehicle operator dismount to couple the implements to the vehicle.

Frequently, more than one person will be required to properly attach the implement.

Quick attach couplers are known for connecting implements to earthmoving equipment, particularly different buckets to front-end loaders. However, while front-end loaders need only to be raised and lowered, implements such as plows, snowblowers and brooms need also to be rotatable in a horizontal plane.

Furthermore, most quick attach couplers are not themselves easily removable from the vehicle. Utility vehicles, which may have implements mounted in the rear and mowers mounted beneath, for purposes of balance, maneuverability, and convenience, would benefit from a coupler that is itself easily removable.

What is needed is a quick attach coupler for utility vehicles which provides for connecting a variety of implements to the vehicle without the operator needing to dismount, which permits rotating the implement in a horizontal plane, and which is itself easily attachable and removable from the vehicle.

SUMMARY OF THE INVENTION

The apparatus for coupling an implement to the front end of a vehicle of this invention has a plurality of brackets connected to the vehicle. Each bracket has a lower portion with a frontwardly opening slot and a hole for receiving a pin spaced above the slot. A coupler is adapted for attachment to the brackets on the vehicle and has an upright brace with two vertical members joined by a horizontal member. A frame is pivotally mounted to the vertical members beneath the horizontal member and an actuator connects the brace and the frame so that the frame may be pivoted towards and away from the brace. A support is pivotally mounted about a vertical axis and has an upturned flange adapted to engage beneath a downturned J-shaped bracket on the implement and has pinholes located beneath the flange to receive pins extending from the implement. An implement coupling mechanism is fixed to the implement and consists of a downturned J-shaped bracket with a vertical portion and an opposed portion which is approximately as deep as the upward extension of the flange on the coupler. Vertical plates are connected on either side of the J-shaped bracket and are spaced to fit on either side of the support of the coupler. The plates are mounted to an implement. Spring-loaded locking pins are located on each vertical plate so that the pins may travel freely through holes in the plates to engage within the locking holes of the coupler. The vertical plates of the coupling mechanism have rounded out-turned edges which horizontally align the implement coupler with the implement.

It is an object of the present invention to provide a coupler for attachment of an implement to a vehicle which does not require the operator to dismount from the vehicle.

A further object of the present invention is to provide a coupling unit which may be easily and rapidly attached and detached from the vehicle.

Another object of the present invention is to provide a quick attach coupler which is rotatable in a horizontal plane.

Yet another object of the present invention is to provide a coupling mechanism for an implement which is adapted to quick attachment to a vehicle coupler.

A still further object of the present invention is to provide a quick attach coupler for a vehicle which can elevate an implement above grade or lower it below grade.

Further objects, features and advantages of the invention will be apparent from the following detailed description when taken in conjunction with the accompanying drawings.

Figure 1:
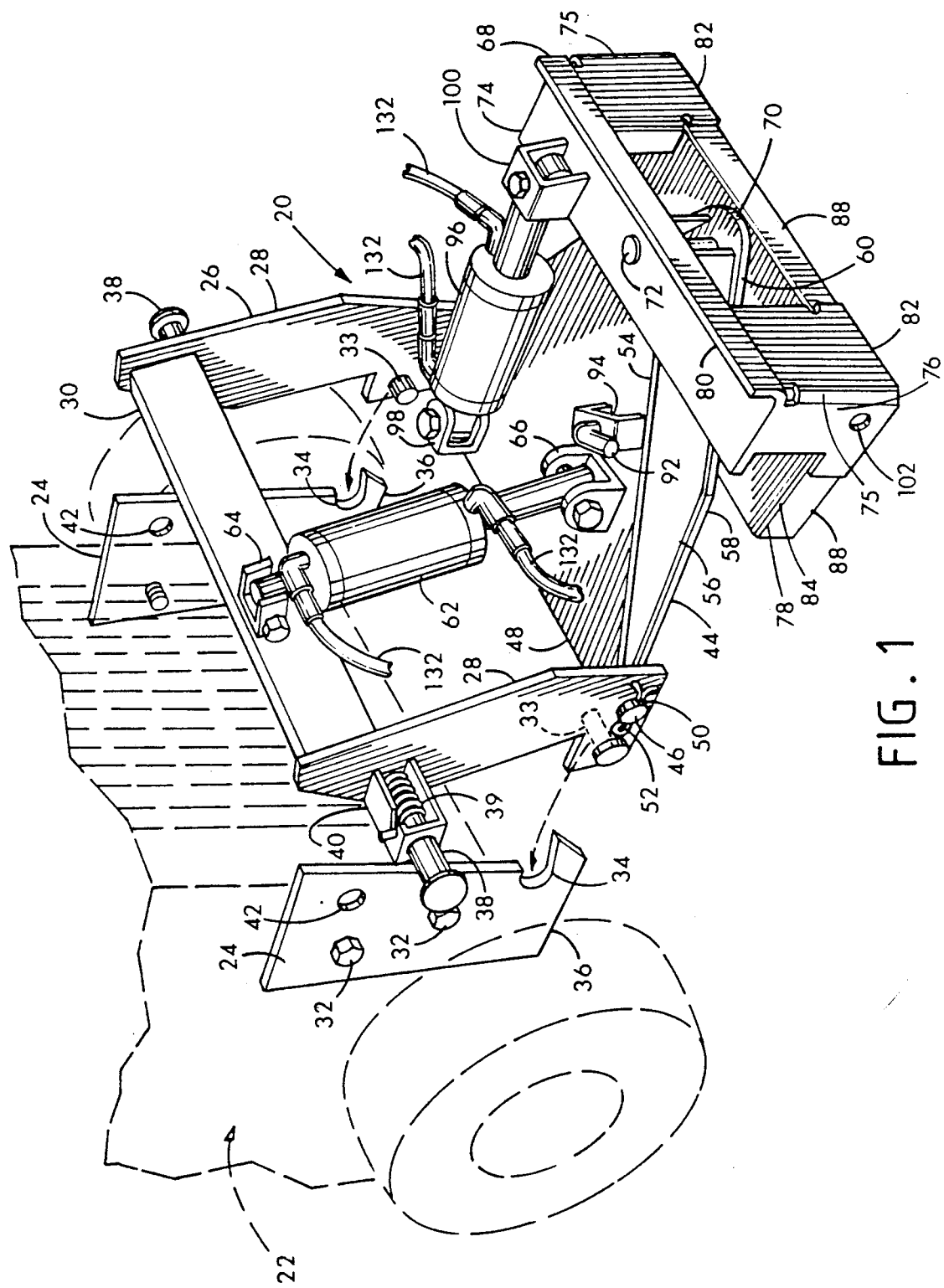
FIG. 1 is an exploded isometric view of the quick attach coupler and mounting bracket of this invention connected to the front end of a tractor.
Figure 2:
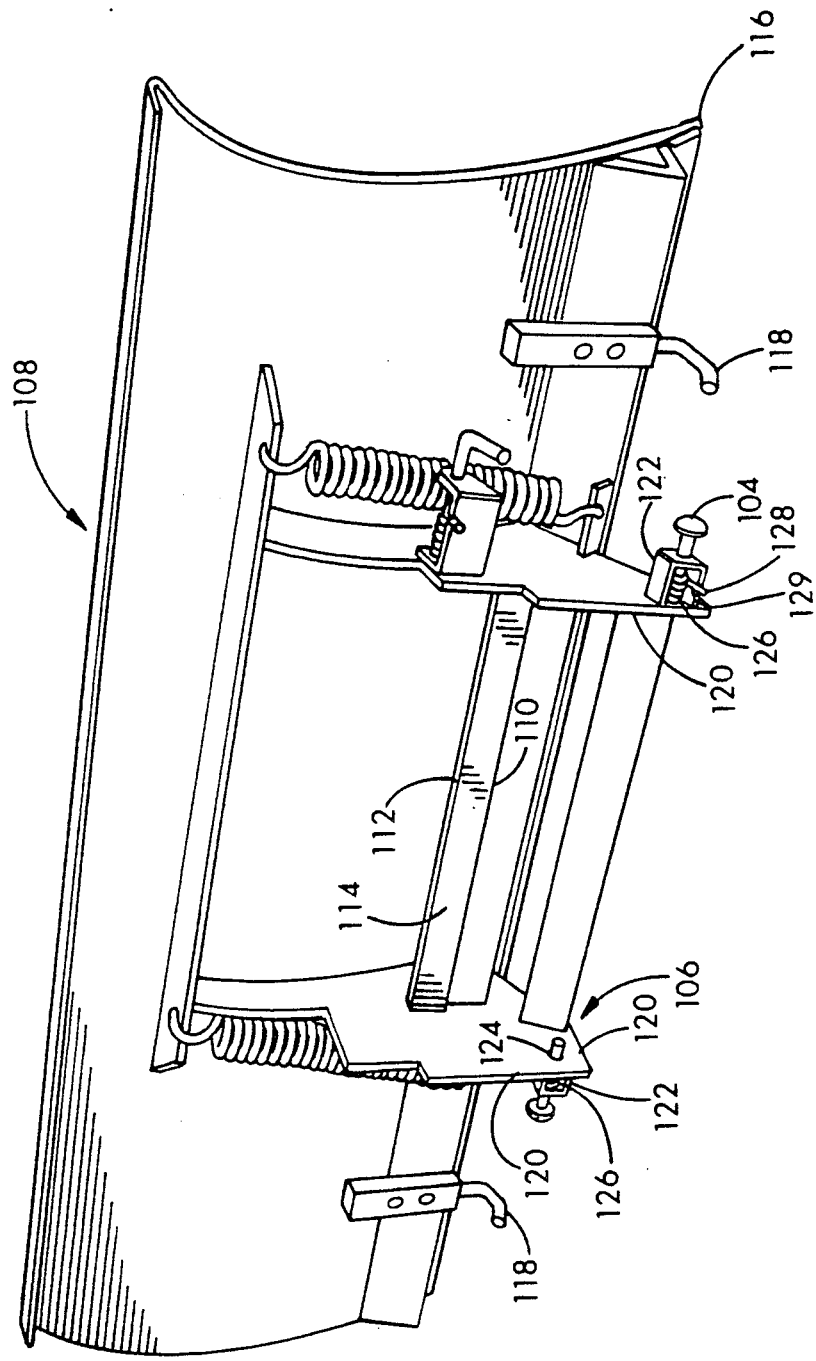
FIG. 2 is a perspective view of a snowplow to which is mounted the quick attach mechanism of this invention.
Figure 3:
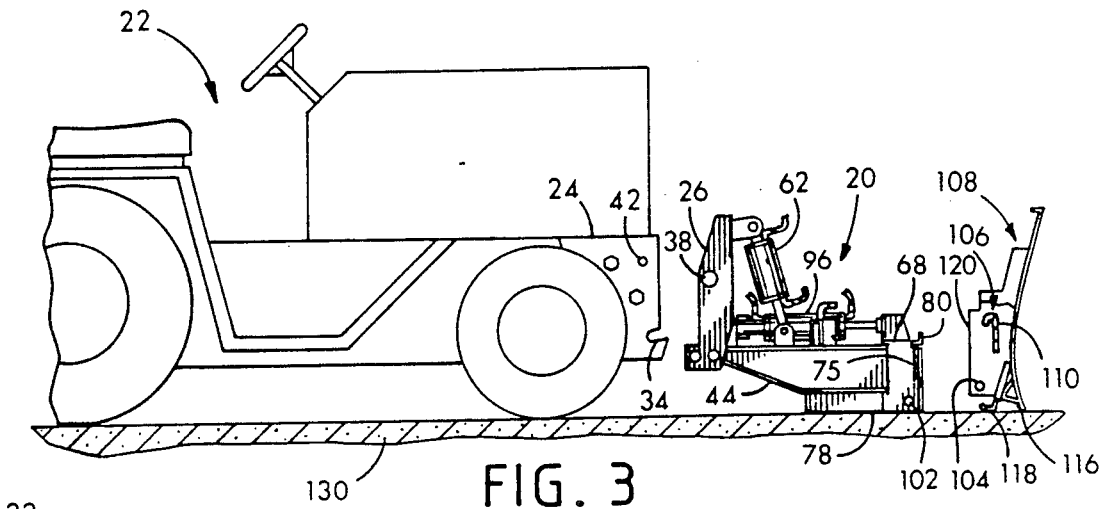

of FIG. 3 and the plow of FIG. 2 resting on the ground prior to attachment to the mounting brackets of FIG. 1 on a conventional tractor.

Figure 4:
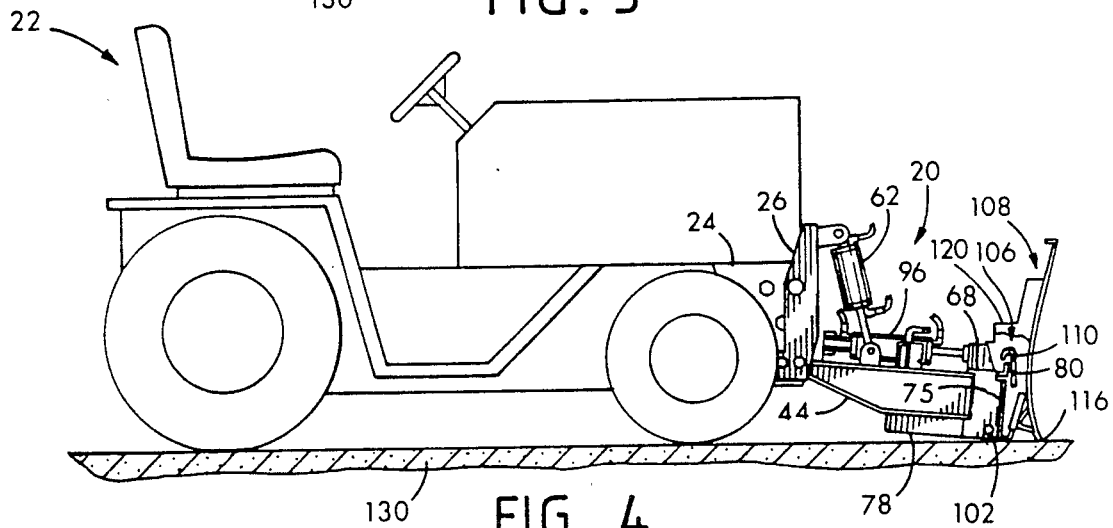

FIG. 4 is a side elevational view of the quick attach coupler of FIG. 3 mounted on the mounting brackets connected to the tractor and positioned beneath the quick attach mechanism of the plow.

Figure 5:
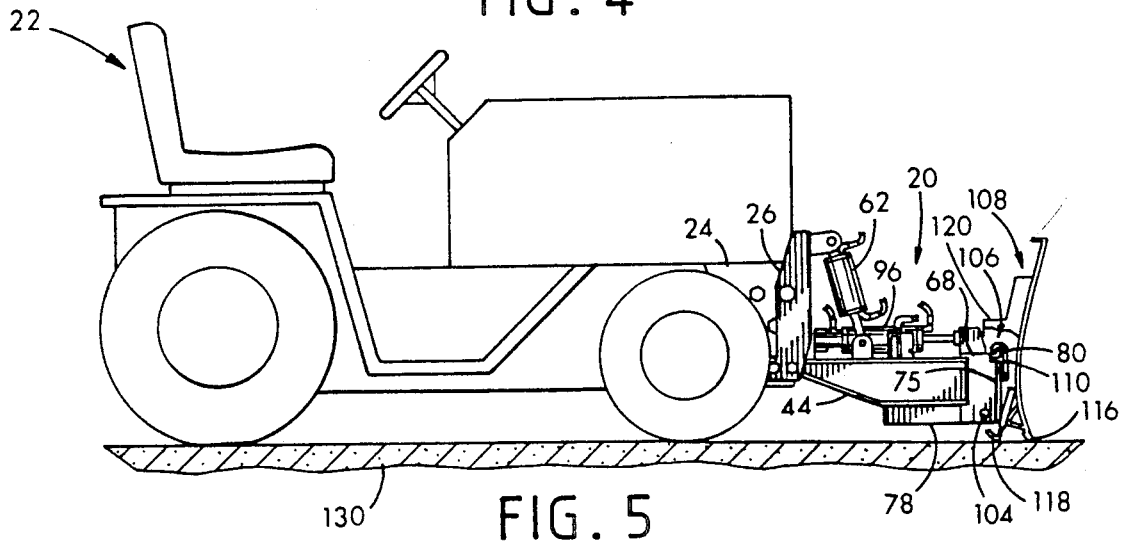

FIG. 5 is a side elevational view of the quick attach coupler of FIG. 4 fully coupled to the quick attach mechanism of the plow.

FIG. 5 is a top plan view of the connected mounting brackets, coupler and implement of FIG. 5.

Figure 6:
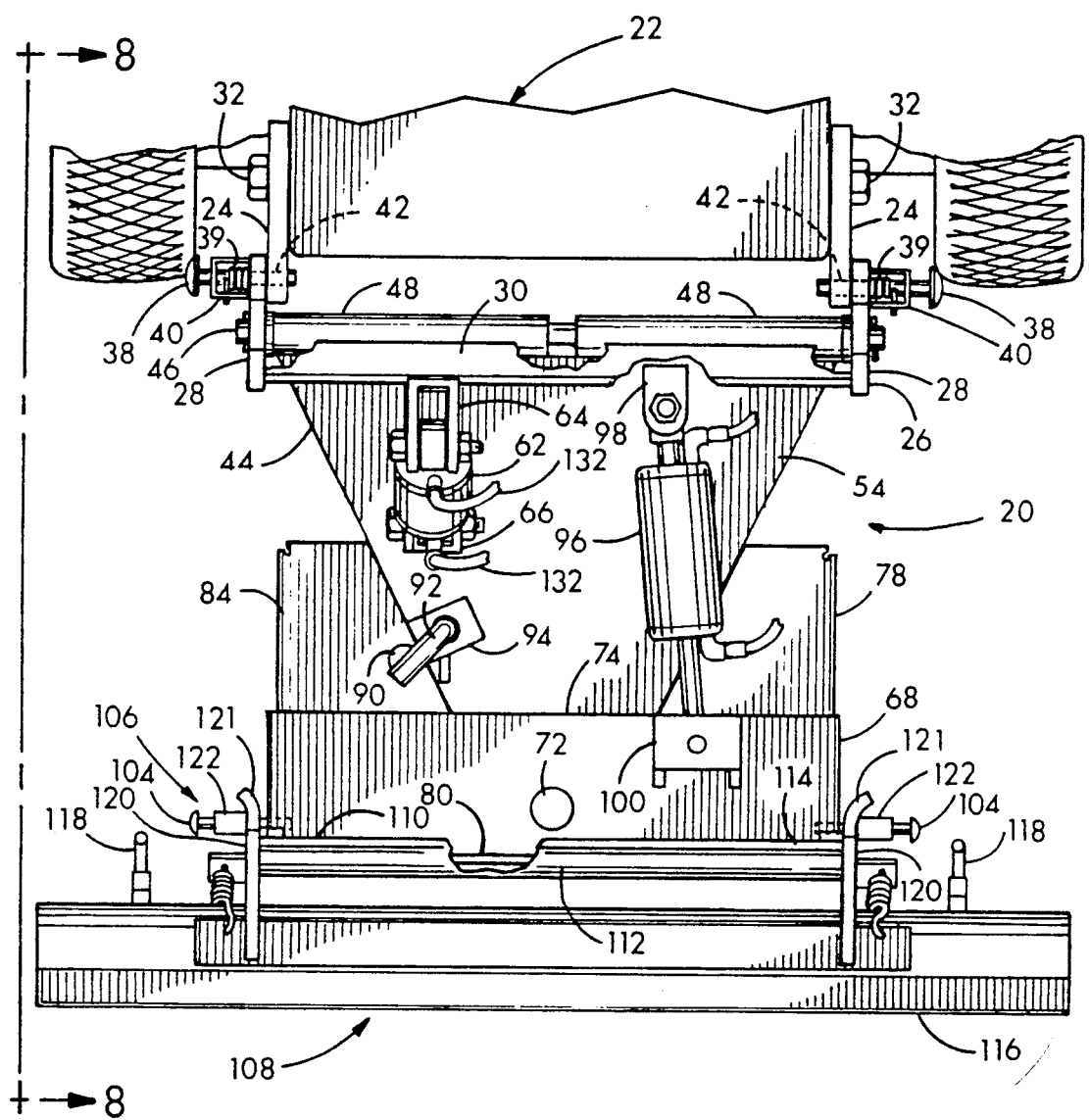

FIG. 6 is a top plan view of the assembly of FIG. 6 with the plow in a full left position.

Figure 7:
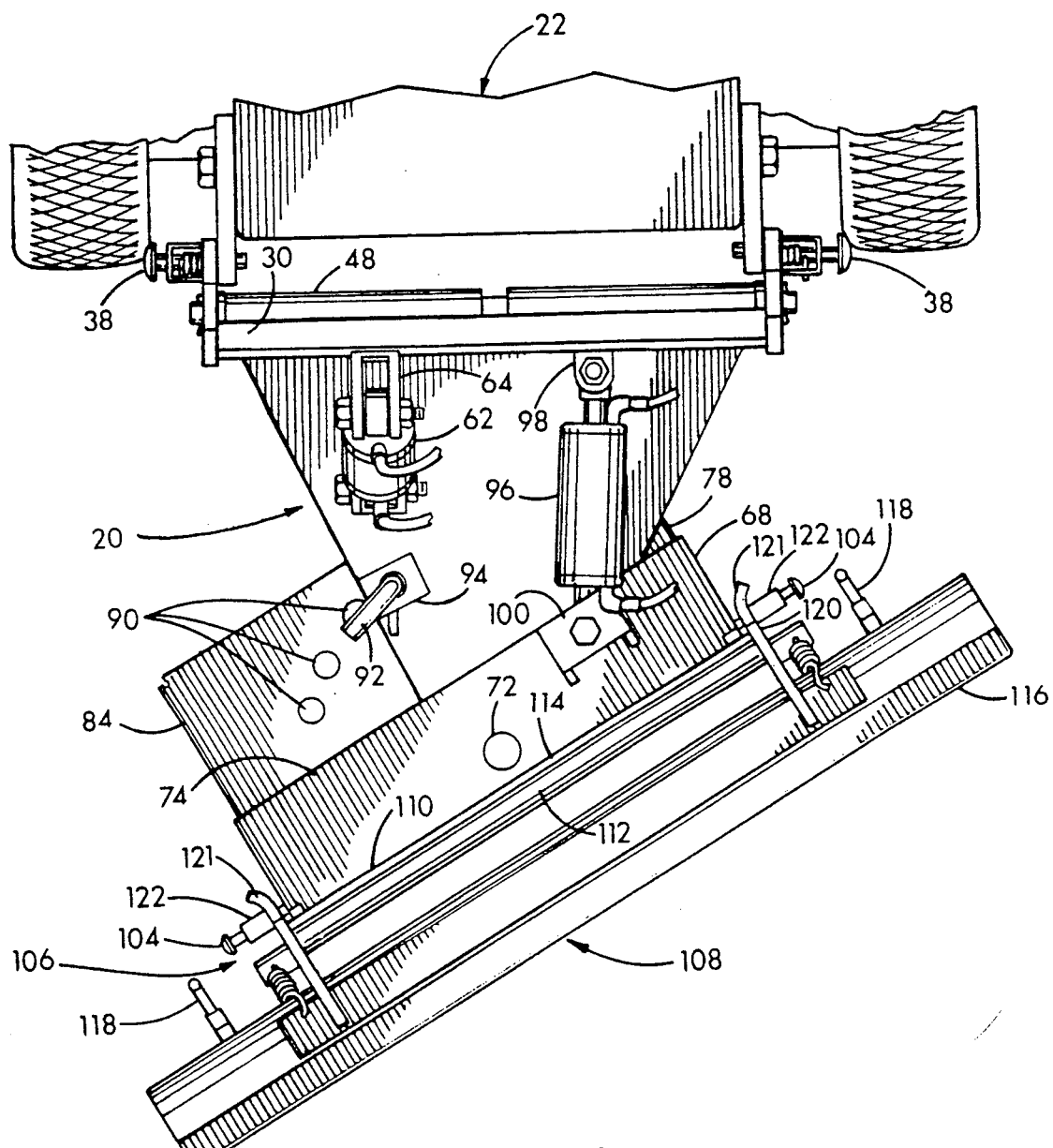

FIG. 7 is a side view of the assembly of FIG. 6 with the coupling mechanism of the implement partially broken away.

DESCRIPTION OF THE PREFERRED EMBODIMENT

Referring more particularly to FIGS. 1-8, wherein like numbers refer to similar parts, a quick attach coupler 20 is shown in FIG. 1. The coupler 20 is used for mounting implements to a vehicle. An implement is any attachment or accessory used in connection with the vehicle for transporting or doing work. The coupler 20 is detachably mounted to the front of a vehicle, here illustrated as a conventional tractor 22, by engagement with two vertical mounting brackets 24.

The coupler 20 has an upright brace or mounting frame 26 which consists of two vertical members joined by a horizontal crossbar. The vertical members 28 are spaced by the crossbar 30 to fit on the outside of the mounting brackets 24 which connected to the tractor 22 by two bolts 32 or may be conventionally provided by the tractor mounting frame. A cylindrical pin 33 is located at the lower end of each vertical member 28 and is positioned to engage within aligned oblong slots 34 in the lower portions 36 of the mounting brackets 24. The oblong slots 34 are inclined upwardly somewhat to retain the fixed pins 33 of the connected coupler 20 against horizontal movement. Spring-loaded pins 38 are mounted in pin brackets 40 on the vertical members 28 above the fixed pins 33. The spring-loaded pins 38 travel through holes (not shown) in the vertical members 28 which when the coupler 20 is attached to the tractor 22 are aligned with through holes 42 located above the slots 34 in the mounting brackets 24. A generally triangular A-frame 44 is pivotally connected to the mounting frame 26 by a rod 46 running through bushings 48 on the rear of the A-frame 44 and through holes 50 in the vertical members 28 forward of the fixed pins 33. The rod 46 is held in place by cotter pins 52. As best seen in the side view of FIG. 8, the A-frame 44 has a planar top plate 54 which has two side plates 56 which connect the top plate 54 to a bottom plate 58 which extends downwardly from the bushings 48 to a front portion which is parallel to the top plate 54. The bushings 48, the top plate 54, the side plates 56 and the bottom plate 58 are rigidly connected such as by welding to make the A-frame 44 a rigid box-like structure.

The A-frame 44 is pivoted about the rod 46 by a vertical actuator 62 which is preferably a hydraulic cylinder. The actuator 62 is pivotally connected to the horizontal crossbar 30 by a bracket 64, and is pivotally connected to the A-frame 44 by a second bracket 66. The travel of the A-frame 44 will depend on the size and extension of the actuator 62, but in the preferred embodiment, the A-frame 44 may be rotated sufficiently to raise an attached implement twelve inches above grade and to depress it three inches below grade.

An implement support 68 is pivotally connected at the apex 70 of the A-frame 44 by a pin 72. The implement support 68 has an upper plate 74 joined by side plates 76 to a pivoting table 78. The upper plate 74 has an upturned flange 80. In the preferred embodiment, the flange extends slightly more than one-half inch above the surface of the upper plate 74. The flange 80 is an extended linear flange, and is preferably formed as one piece with the upper plate 74. Additional rigidity is imparted to the implement supports 68 by front plates 82 which are connected to the side plates 76 and the pivoting table 78 but which need not be connected directly to the upper plate 74. The upper plate 74, side plates 76, and front plates 82 as well as the flange 80 may be formed of a single bent sheet of steel plate. A locking hole 102 is located in each support side plate 76 and is of suitable diameter for receiving the locking pins 104 mounted on the implement 108.

A beveled surface 75 is formed where the front plates 82 meet the side plates 76 of the support, forward of the locking holes 102. The surfaces 75 act as cams to gradually depress the spring mounted locking pins 104 on the implement 108 when the coupler 20 is connected to the implement coupling mechanism 106 on the implement 108.

The pivoting table 78 has an upper pivot plate 84 and a bottom pivot plate 86 connected by sides 88 to form a rigid box. The upper and bottom pivot plates 84, 86 have a series of radial holes 90 which accept a locking rod 92 spring-loaded in a bracket 94 mounted on the top plate 54 of the A-frame 44 for locking the implement support 68 at a fixed angle to the A-frame 44.

The implement support 68 is pivoted on the A-frame 44 about the pin 72 by a horizontal actuator 96 which is preferably a hydraulic cylinder and piston assembly. The actuator 96 is pivotally connected to the A-frame 44 by a bracket 98 fixed to the top plate 54 adjacent the bushings 48, and is pivotally connected to the support 68 by a bracket 100.

Locking holes 102 extend through the side plates 76 of the implement support 68 and the sides 88 of the pivoting table 78 and are adapted to engage with the locking pins 104 of an implement coupling mechanism 106 attached to an implement 108, as shown in FIG. 2.

The implement 108 illustrated is a conventional snowplow, but may be any implement for mounting to a vehicle, for example, a snowblower, a tiller or a broom.

Figure 8:
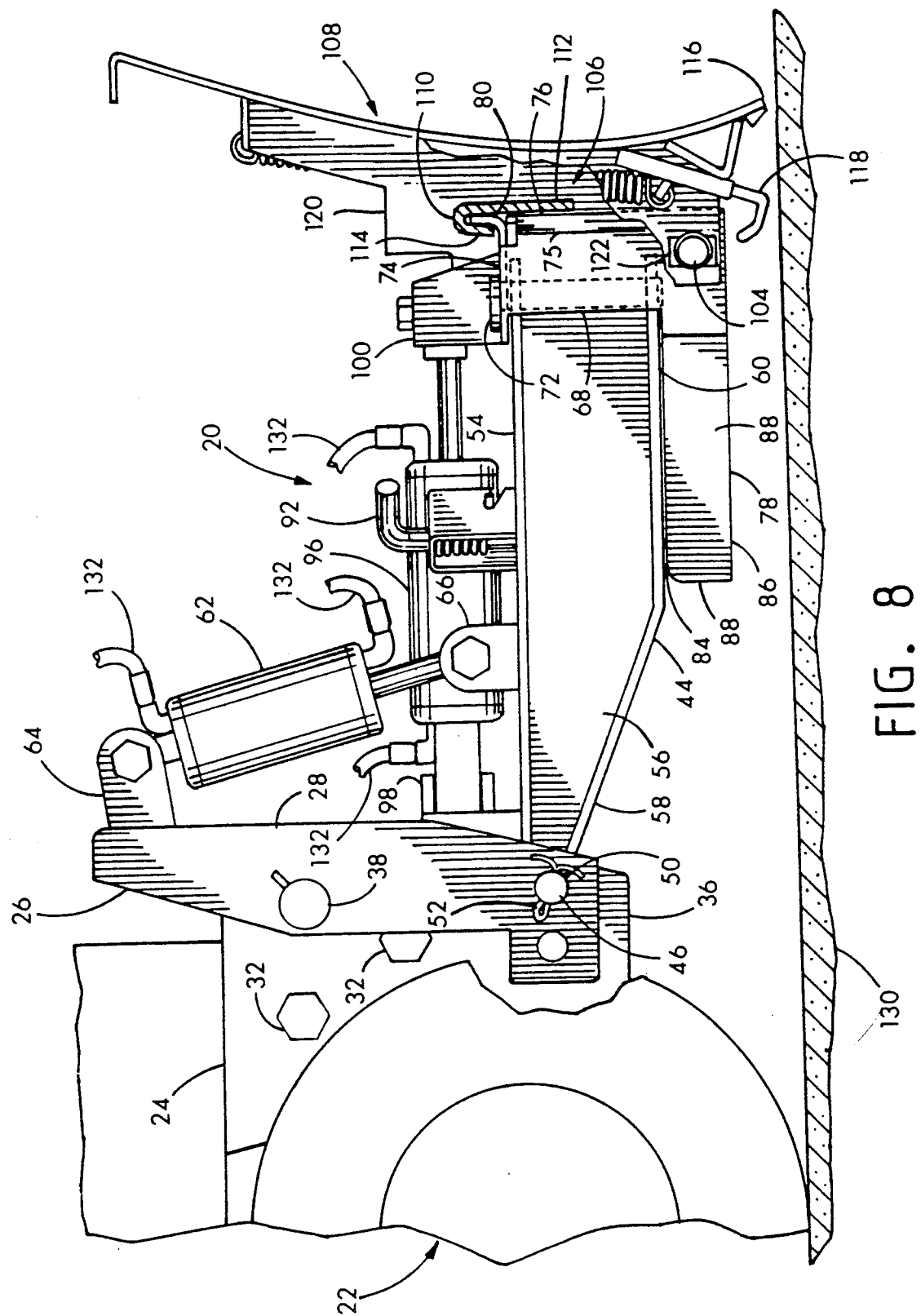

As best shown in FIGS. 2 and 8, the implement coupling mechanism 106 consists of a downturned J-shaped bracket 110 mounted to two vertical side plates 120 above two spring-loaded locking pins 104 running through the plates 120. The downturned J-shaped bracket 110 has a vertical portion 112 and an opposed portion 114 which extends downwardly approximately the same distance as the flange 80 extends upwardly from the upper plate 74 of the implement support 68. The opposed portion 114 is inclined outwardly somewhat from the vertical portion 112 and the two portions 112, 114 define a wedge-shaped space which acts to capture the inserted flange 80 of the support 68. The vertical portion 112 is preferably longer than the opposed portion to serve as an abutment against which the approaching coupler 20 may make contact. The vertical portion 112 then acts to direct the flange 80 into engagement between the opposed portion and the vertical portion. The bracket 110 is connected at its ends to the vertical side plates 120. Each side plate has radiused out-turned edges 121 which assist in aligning the coupler 20 with the coupling mechanism 106 on the implement 108. The locking pins 104 are located on the side plates 120 beneath the J-shaped bracket 110 and are on either side of the J-shaped bracket 110. The locking pins 104 are spaced from the bracket 110 such that when the bracket 110 is engaged on the upturn flange 80 the locking pins 104 will be in position to engage with the locking holes 102 of the coupler 20. The locking pins 104 are retained in brackets 122 mounted on the vertical plates 120 adjacent clearance holes 124 to permit the movement of the locking pins 104 which are spring-loaded by springs 126 engaging with protruding studs 128 extending from each locking pin 104.

The exemplary implement 108 shown has a plow blade 116 and two feet 118 which support the implement 108 and the implement coupling mechanism 106 in an upright position. The coupling mechanism 106 is connected to the implement 108 by the two opposed vertical plates 120.

The operation of the quick attach coupler 20 and implement coupling mechanism 106 of this invention is illustrated in FIGS. 3, 4 and 5. In FIG. 3 the tractor 22 has been parked adjacent the coupler 20 and the implement 108 which are resting on the ground 130 in upright positions. To attach the coupler 20 to the tractor 22 the operator dismounts from the tractor and lifts the coupler 20 and slides the fixed pins 33 of the mounting frame 26 into the oblong slots 34 of the mounting brackets 24. With the weight of the coupler 20 substantially supported by the mounting brackets 24 the coupler 20 is rotated towards the tractor 22. The spring-loaded pins 38 in the vertical members 28 of the mounting frame 26 are positioned over the through holes 42 in the mounting brackets 24 and with the spring-loaded pins 38 released from their retracted positions, the springs 39 urge the pins to engage in the through holes 42. Once the coupler 20 is mechanically attached to the tractor 22, the hydraulic lines 132 (shown partly broken away) are connected to the hydraulic fittings (not shown) of the tractor 22.

Once the coupler 20 has been attached to the tractor 22, the operator may quickly attach an implement to the tractor 22 without having to dismount from the tractor 22. To achieve the attachment, the vertical actuator 62 is activated to depress the A-frame 44 and the connected implement support 68 so that the implement support 68 is angled downwardly towards the ground 130 as shown in FIG. 4. With the implement support 68 so inclined, the tractor 22 is advanced towards the implement 108 which is resting with the locking pins 104 released and urged by the springs 126 to extend through the vertical plates 120. The tractor 22 is advanced towards the implement 108 until the upturned flange 80 is positioned directly below the downturned J-shaped bracket 110 of the implement coupling mechanism 106 of the implement 108. The curved edges 121 of the vertical plates 120 guide the implement coupler 20 into proper alignment with the implement coupling mechanism 106. When the upturned flange 80 makes contact with the vertical portion 112 of the J-shaped flange the operator may then raise the support to bring the flange 80 into engagement between the vertical portion 112 and the opposed portion 114 of the downturned J-shaped bracket 110.

The coupler 20 is thus engaged with the implement 108 by activating the vertical actuator 62 to rotate the A-frame 44 and the implement support 68 about the bushings 48 to raise the upturned flange 80 into engagement with the J-shaped bracket 110 of the implement coupling mechanism 106. As the flange 80 rotates into engagement with the bracket 110, and the implement 108 is lifted by the coupler 20, the locking pins 104 of the implement coupling mechanism travel over the beveled surfaces 75 of the implement support 68, being depressed against the springs 126 until the locking pins 104 are positioned over the locking holes 102 at which point the springs 126 drive the locking pins 104 into engagement with the locking holes 102. At this point, as shown in FIG. 5, the implement coupling mechanism 106 and the implement 108 are securely attached to the coupler 20 and the tractor 22.

As shown in FIG. 6, the weight of the implement 108 is carried by the upturned flange 80 of the support 68 and is distributed along the linear length of the flange 80. The attached implement may be raised or lowered as desired for transporting the implement or performing work, by hydraulic operation of the vertical actuator 62. The horizontal actuator 96 may be used to turn the implement to the right or the left (as shown in FIG. 7). In the preferred embodiment, the horizontal actuator 96 is sufficient to rotate the implement 30° to the right or to the left. The hydraulic control system of the tractor may additionally permit the implement to float and follow the terrain when desired.

If it is not desired to rotate the implement, or if the hydraulic lines leading to the horizontal actuator 96 are to be used for controlling functions of the implement, the implement support 68 may be locked into position by use of the locking rod 92 which may be inserted into any of the holes 90 in the pivoting table 78.

To detach an implement from the coupler 20 the locking pins 104 of the implement coupling mechanism 106 are pulled outward into the retracted position engaging the studs 128 on the pins 104 within slots 129 on the brackets 122. The A-frame 44 and the implement support 68 are rotated downwardly by activating the vertical actuator 62 until the upturned flange 80 is disengaged from the L-shaped bracket 110 freeing the coupler 20 to move away from the implement 108.

The implement coupling mechanism 106 may be affixed to any conventional implement. Hence, an operator may rapidly exchange implements. It should be noted that the particular shape of the vertical plates 120 and the structure for connecting the implement coupling mechanism 106 to the implement may vary depending on the configuration of the implement to which the coupling mechanism 106 is affixed. Although, for clarity, an under-vehicle mower has not been illustrated, the present bracket 24 and coupler 20 assembly may easily be mounted on a vehicle having such a mower mounted thereon without interference.

Furthermore, although the coupler has been illustrated attached to the front end of a vehicle, it may also be effectively attached to the back of a vehicle if desired. Although the vehicle illustrated is a tractor, the coupler may be attached to any vehicle, including a utility cart, a truck, a lift truck or other vehicle.

It is understood that the invention is not confined to the particular construction and arrangement of parts herein illustrated and described, but embraces such modified forms thereof as come within the scope of the following claims:

I claim:

1. A quick attach implement coupler for connecting an implement with a downturned bracket and extendable locking pins to a vehicle, comprising:
    (a) an upright brace having two vertical members and a connecting horizontal member, the vertical members being adapted for detachable mounting to a vehicle;
    (b) a frame pivotally mounted on a horizontal axis to the vertical members beneath the horizontal member;
    (c) an actuator connecting the brace and the frame such that the frame may be pivoted about the horizontal axis;
    (d) a support pivotally mounted on the frame about a vertical axis and having an upturned flange adapted to detachably engage beneath a downturned bracket of an implement, the support having vertical side plates with frontwardly facing beveled surfaces providing means for engaging and depressing spring-loaded locking pins extending from the implement when the support is moved into engagement with the implement, the vertical side plates having portions defining pinholes located beneath the flange to receive the spring-loaded locking pins when the support is fully engaged with the implement to connect the implement to the apparatus, wherein a connected implement will be raised and lowered as the actuator pivots the frame about the horizontal axis.

2. The apparatus of claim 1 further comprising a horizontal actuator connecting the frame and the support such that the actuator may rotate the support about the vertical mounting axis to change the angle of a mounted implement with respect to the position of the vehicle.

3. An apparatus for connecting an implement with a downturned bracket and extendable locking pins to a vehicle, comprising:
(a) an upright brace having two vertical members and a connecting horizontal member, the vertical members being adapted for attachment to a vehicle;
(b) a frame pivotally mounted on a horizontal axis to the vertical members beneath the horizontal member;
(c) an actuator connecting the brace and the frame such that the frame may be pivoted about the horizontal axis;
(d) a support pivotally mounted on the frame about a vertical axis and having an upturned flange adapted to engage beneath a downturned bracket of an implement, the support having portions defining pinholes located beneath the flange to receive locking pins extending from the implement to connect the implement to the apparatus, wherein a connected implement will be raised and lowered as the actuator pivots the frame about the horizontal axis;
(e) a plurality of mounting brackets having upper and lower portions and rigidly connected to a vehicle, each mounting bracket having a frontwardly opening slot in the lower portion of the bracket and a through hole in the upper portion of the bracket;
(f) fixed pins extending from the vertical members and adapted to engage within the slots of the mounting brackets; and
(g) spring loaded pins mounted on the vertical members above the fixed pins and adapted to engage in the through holes in the mounting brackets, to detachably connect the coupling apparatus to the vehicle.

4. A coupling mechanism for attaching an implement to a vehicle-mounted coupler having an upturned flange and two spaced pinholes beneath the flange, comprising:
(a) a downturned J-shaped bracket having a vertical portion and an opposed portion, the opposed portion being approximately as deep as the upward extension of the flange on the coupler;
(b) vertical plates connected on either side of the J-shaped bracket and adapted to connect the coupling mechanism to an implement and having portions defining pinholes spaced beneath the J-shaped bracket; and
(c) spring-loaded locking pins located on each vertical plate so that the pins may travel freely in the pinholes, said pins providing means for engaging and being depressed by beveled surfaces of the coupler when the coupler is moved into engagement with the implement coupling mechanism, and to engage within the locking holes of the coupler when the coupler is fully engaged with the implement.

5. The implement coupling mechanism of claim 4 wherein the vertical plates have rounded out-turned edges adapted to horizontally align an implement coupler for engagement with the coupling mechanism.

6. The coupling mechanism of claim 4 wherein the opposed portion is inclined away from the vertical portion and the vertical portion is longer than the opposed portion and serves to align the upturned flange of a coupler pressed against the vertical portion between the vertical portion and the opposed portion of the J-shaped bracket.

7. An apparatus for coupling an implement to a vehicle with an end, comprising:
(a) at least one bracket connected to the end of the vehicle;
(b) a coupler adapted for detachable attachment to the bracket, the coupler including an upright brace having two vertical members joined by a horizontal member, a frame pivotally mounted to the vertical members about a horizontal axis, an actuator connecting the brace and the frame such that the frame may be pivoted about the horizontal axis by the actuator, a support pivotally mounted to the frame about a vertical axis and having an upturned flange, and portions on the support defining pinholes located beneath the flange; and
(c) an implement coupling mechanism attached to the implement and having a downturned J-shaped bracket with a vertical portion and a spaced opposed portion, vertical plates connected on either side of the J-shaped bracket and attached to the implement and having portions defining pinholes spaced beneath the J-shaped bracket such that when the downturned J-shaped bracket is engaged upon the upturned flange of the coupler the pinholes on the vertical plates align with the pinholes in the support, and spring-loaded locking pins located on each vertical plate so that the pins may travel freely in the pinholes of the vertical plates, said pins providing means for engaging and being depressed by the support when the support is moved into engagement with the implement coupling mechanism and for engaging within the locking holes of the support when the support is fully engaged with the implement coupling mechanism, wherein the implement coupling mechanism is mounted to the implement to permit rapid attachment of the implement to the vehicle by engagement of the upturned flange of the coupler with the downturned bracket of the implement coupling mechanism by the elevation of the support so that the flange and bracket engage and so the spring-loaded pins of the coupling mechanism engage with the pin holes in the support.

8. The apparatus of claim 7 further comprising a horizontal actuator connecting the frame and the support such that the actuator may rotate the support about the vertical mounting axis to change the angle of a mounted implement with respect to the position of the vehicle.

9. The apparatus of claim 7 wherein the vertical plates have rounded out-turned edges adapted to horizontally align the implement coupler for engagement with the coupling mechanism.

10. The apparatus of claim 7 wherein the pinholes are defined by portions of vertical side plates on the support and wherein the side plates have frontwardly facing beveled surfaces adapted to engage and depress the extendable locking pins on the vehicle when the support is moved into engagement with the implement.

11. The apparatus of claim 7 wherein the opposed portion of the J-shaped bracket is inclined away from the vertical portion and the vertical portion is longer than the opposed portion to serve to align and to direct the upturned flange of a coupler pressed against the vertical portion into engagement between the vertical portion and the opposed portion of the J-shaped bracket.

12. An apparatus for coupling an implement to a vehicle with an end, comprising:
- (a) at least one bracket connected to the end of the vhecile;
- (b) a coupler adapted for attachment to the bracket, the coupler including an upright brace having two vertical members joined by a horizontal member, a frame pivotally mounted to the vertical members about a horizontal axis, an actuator connecting the brace and the frame such that the frame may be pivoted about the horizontal axis by the actuator, a support pivotally mounted to the frame about a vertical axis and having an upturned flange, and portions on the support defining pinholes located beneath the flange; and
- (c) an implement coupling mechanism attached to the implement and having a downturned J-shaped bracket with a vertical portion and a spaced opposed portion, vertical plates connected on either side of the J-shaped bracket and attached to the implement and having portions defining pinholes spaced beneath the J-shaped bracket such that when the downturned J-shaped bracket is engaged upon the upturned flange of the coupler the pinholes on the vertical plates align with the pinholes in the support, and spring-loaded locking pins located on each vertical plate so that the pins may travel freely in the pinholes of the vertical plates to engage within the locking holes of the support, wherein the implement coupling mechanism is mounted to the implement to permit rapid attachment of the implement to the vehicle by engagement of the upturned flange of the coupler with the downturned bracket of the implement coupling mechanism by the elevation of the support so that the flange and bracket engage and so the spring-loaded pins of the coupling mechanism engage with the pin holes in the support;
- (d) a plurality of mounting brackets having upper and lower portions and rigidly connected to the end of a vehicle, each mounting bracket having a frontwardly opening slot in the lower portion of the bracket and a through hole in the upper portion of the bracket;
- (e) fixed pins extending from the vertical members and adapted to engage within the slots of the mounting brackets; and
- (f) spring loaded pins mounted on the vertical members above the fixed pins and adapted to engage in the through holes in the mounting brackets, to detachably connect the coupling apparatus to the vehicle.

* * * * *